(12) United States Patent
Peckover et al.

(10) Patent No.: US 7,567,936 B1
(45) Date of Patent: Jul. 28, 2009

(54) METHOD AND APPARATUS FOR HANDLING PSEUDO IDENTITIES

(75) Inventors: Douglas L. Peckover, Dallas, TX (US); Thomas L. Allen, Allen, TX (US); Benjamin L. Wright, Dallas, TX (US)

(73) Assignee: Paradox Technical Solutions LLC, Wilmington, DE (US)

( * ) Notice: Subject to any disclaimer, the term of this patent is extended or adjusted under 35 U.S.C. 154(b) by 783 days.

(21) Appl. No.: 10/967,019

(22) Filed: Oct. 15, 2004
(Under 37 CFR 1.47)

Related U.S. Application Data

(63) Continuation of application No. 10/965,700, filed on Oct. 14, 2004.

(60) Provisional application No. 60/511,718, filed on Oct. 14, 2003.

(51) Int. Cl.
*G06Q 40/00* (2006.01)
(52) U.S. Cl. .......................... 705/38; 715/224; 715/225; 715/226
(58) Field of Classification Search .................. 705/35, 705/38–39; 235/379–381; 715/224–226
See application file for complete search history.

(56) References Cited

U.S. PATENT DOCUMENTS

| | | | | |
|---|---|---|---|---|
| 5,710,889 | A * | 1/1998 | Clark et al. .................. 235/379 |
| 5,873,072 | A | 2/1999 | Kight et al. | |
| 6,192,380 | B1 | 2/2001 | Light et al. | |
| 6,609,654 | B1 | 8/2003 | Anderson et al. | |
| 6,970,852 | B1 | 11/2005 | Sendo et al. | |
| 6,980,969 | B1 | 12/2005 | Tuchler et al. | |
| 7,136,835 | B1 | 11/2006 | Flitcroft et al. | |
| 7,242,921 | B2 | 7/2007 | Sullivan et al. | |
| 2001/0029496 | A1 * | 10/2001 | Otto et al. ...................... 705/74 |
| 2001/0032192 | A1 * | 10/2001 | Putta et al. .................... 705/76 |
| 2001/0044787 | A1 * | 11/2001 | Shwartz et al. ................. 705/78 |
| 2002/0120559 | A1 | 8/2002 | O'Mara et al. | |
| 2004/0111751 | A1 | 6/2004 | Tsuria | |
| 2004/0236819 | A1 | 11/2004 | Anati et al. | |
| 2006/0026098 | A1 | 2/2006 | Peckover et al. | |

FOREIGN PATENT DOCUMENTS

WO  9949424  9/1999

OTHER PUBLICATIONS

Peter Wayner's article "A Tool for Anonymity on the Internet", New York Times, Dec. 16, 1999. p. G.17.*
U.S. Appl. No. 10/966,361; filed Oct. 15, 2004.
U.S. Appl. No. 10/967,021; filed Oct. 15, 2004.

(Continued)

*Primary Examiner*—Mary Cheung
*Assistant Examiner*—Brian Fertig

(57) ABSTRACT

An electronic device is configured for use by a user who is a natural person, and has a network port through which the user can access an electronic network. The device can receive through the network port an information request intended for presentation to the user, the information request including a request for an actual identifier associated with the user. The device can respond to the information request in a manner that includes activating within the device a manager portion thereof that facilitates providing the information request with a pseudo identifier in place of the actual identifier.

19 Claims, 2 Drawing Sheets

OTHER PUBLICATIONS

Non-Final Rejection; U.S. Appl. No. 10/965,700; mailed Mar. 18, 2008.
Response to Non-Final Rejection; U.S. Appl. No. 10/965,700; filed May 16, 2008.
Final Rejection; U.S. Appl. No. 10/965,700, mailed Aug. 22, 2008.
U.S. Appl. No. 10/965,700; filed Oct. 14, 2004.
U.S. Provisional Patent Application No. 60/581,246; filed Jun. 18, 2004.
Non-Final Rejection; U.S. Appl. No. 11/153,224; mailed Mar. 5, 2008.
Response to Non-Final Rejection; U.S. Appl. No. 11/153,224; filed Jul. 3, 2008.

* cited by examiner

METHOD AND APPARATUS FOR HANDLING PSEUDO IDENTITIES

This application is a continuation of U.S. Ser. No. 10/965,700 filed Oct. 14, 2004 by inventors Douglas L. Peckover et al. and entitled "METHOD AND APPARATUS FACILITATING ELECTRONIC TRANSACTIONS", which claims the priority under 35 U.S.C. §119 of provisional application No. 60/511,718 filed on Oct. 14, 2003.

FIELD OF THE INVENTION

This invention relates in general to pseudo identities and, more particularly, to techniques for handling pseudo identities.

BACKGROUND

The last several years have witnessed a rapid growth in electronic transactions, especially those executed partly or wholly through the Internet. For example, a consumer can use the Internet to access an Internet Web site of a seller, can select a product, and can then provide identity and credit card information to the seller in order to purchase the product.

These types of transactions have led to increased concerns about various rights of privacy. In this regard, a consumer who purchases products or services through the Internet may be tracked or profiled in a way that the consumer does not intend or desire. For example, over a period of time, the consumer may make several different purchases through the Internet from a given seller. The seller can usually recognize that the orders are related, for example where they all involve use of the same credit card number, and/or where the consumer provides the same identity information for each transaction. The seller can then use this linked information to build a profile for that consumer, for example regarding the types of products purchased, brand preferences, quality preferences, buying patterns, frequency of orders, and so forth. The seller may even go so far as to use the profile to begin sending the consumer targeted advertisements that are unsolicited and unwanted. To the extent the consumer does not intend or desire that sellers engage in activity such as creating profiles or sending unsolicited advertisements, these types of activities raise privacy issues.

One technique for addressing these concerns is to provide the consumer with one or more pseudo identities, along with one or more pseudo accounts that can be used to make actual payments. When the consumer makes an electronic purchase, the consumer uses a pseudo identity and a pseudo account number, instead of providing the seller with the consumer's actual identity and actual account number. A financial institution charges the amount of the payment against the consumer's actual account, but pays the seller under the pseudo account number, without revealing the consumer's actual identity or actual account to the seller.

If the consumer makes several successive purchases from the same seller, the consumer can use a different pseudo identity and pseudo account number for each such purchase. Since these purchases would not share any common identifying information, it would appear to the seller that they originated from various different consumers. The seller would thus have no motivation or basis for recognizing that the orders are related, or for attempting to develop a single consumer profile based on the multiple orders. Under this approach, a given consumer may end up with a number of different pseudo identities and a number of different pseudo accounts. There is a need for a way to assist a consumer in effectively and efficiently handling the creation, maintenance and use of multiple pseudo identities and/or multiple pseudo accounts.

The types of electronic transactions discussed above have also caused an increase in concerns about fraud. One aspect of this is that, given the nature of the Internet, it is more difficult to determine whether a given seller is actually who he or she claims to be. And a consumer or a financial institution cannot easily tell whether a particular seller is located in the United States, or in some other country on the other side of the world, where the prevailing law may be significantly different. Another aspect is that, when a seller sends a financial institution a payment request with information such as a credit card number, the financial institution often has only a very brief period of time in which to analyze the developing transaction and to decide whether to approve or deny payment, because the consumer and seller are both waiting in real time for the decision. For example, the financial institution may need to carry out the risk analysis in only one or two seconds. There is a need to provide improved safeguards against fraud in the types of electronic transactions discussed above.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
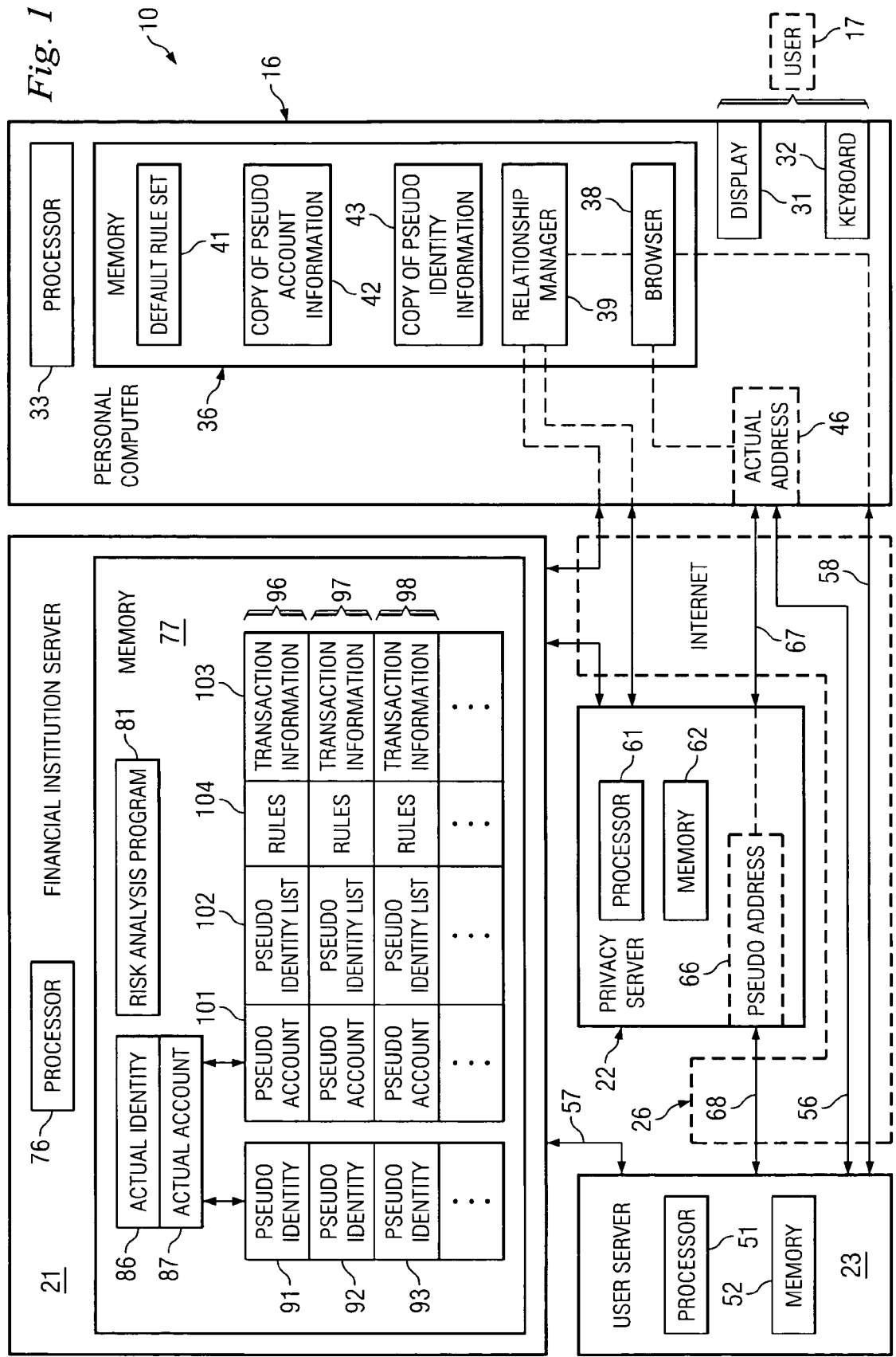
FIG. 1 is a block diagram of an apparatus which is an electronic system, and which embodies aspects of the present invention.

FIG. 1 is a block diagram of an apparatus which is an electronic system 10, and which embodies aspects of the present invention. The system 10 includes a personal computer 16 operated by a human user 17, and also includes a financial institution server 21, a privacy server 22, and a user server 23. In addition, the system 10 includes a portion of the Internet 26, which provides communication between the personal computer 16, financial institution server 21, privacy server 22, and user server 23. FIG. 1 is not intended to depict all aspects of the electronic system 10. Instead, for simplicity and clarity in explaining the present invention, FIG. 1 depicts only selected aspects of the system 10 that facilitate an understanding of the present invention. As one example, the personal computer 16 may obtain access to the Internet 26 through an Internet Service Provider (ISP), but the ISP is considered to be a part of the Internet and, for clarity, is not separately shown in FIG. 1.

The personal computer 16 has a hardware configuration that is commercially available. For example, hardware suitable for use as the personal computer 16 can be obtained commercially from Dell, Inc. of Round Rock, Tex. The computer 16 includes a display 31 of a known type, such as a cathode ray tube (CRT) monitor. The computer 16 has a standard keyboard 32, and may also have a standard and not-illustrated pointing device, such as a mouse. The display 31 and the keyboard 32 provide an interface for use by the human user 17.

The computer 16 includes a processor 33, which may be any suitable processor or microprocessor. In the disclosed embodiment, the processor 33 is a device sold commercially under the trademark PENTIUM® by Intel Corporation of Santa Clara, Calif. The computer 16 has a memory 36, which is shown diagrammatically in FIG. 1, and which collectively represents several different types of memory that are present in the computer 16. For example, the memory 16 includes a hard disk drive, a "flash" random access memory (RAM), a volatile random access memory, a read only memory (ROM), and so forth. The memory 36 stores a variety of programs that can be executed by the processor 33, including a standard Internet browser 38. In the disclosed embodiment, the browser 38 is an industry-standard program such as INTERNET EXPLORER or NETSCAPE NAVIGATOR. The memory 36 also stores a relationship manager program 39, which can be executed by the processor 33, and which is described in more detail later. Further, the memory 36 stores some data that is described in more detail later, including a default rule set 41, a copy 42 of certain pseudo account information, and a copy 43 of certain pseudo identity information.

In the present discussion, it is assumed that the ISP for the user 17 provides all electronic mail (e-mail) capability in a form commonly known as Web mail, where sent and received messages are stored at a Web site that is maintained by the ISP, and that can be accessed by the browser 38 through the Internet 26. When the user 17 sends or receives e-mails, the e-mails are sent to or from the user's actual e-mail address, which is represented diagrammatically at 46. To facilitate the present explanation, it is also assumed that the servers 21-23 each carry out normal operation on an automated basis, without any significant human involvement. Human involvement with these servers would occur only infrequently, for example to carry out routine maintenance.

The user server 23 utilizes hardware of a known type, including a processor 51 and a memory 52. In the discussion that follows, it is assumed for simplicity that the user server 23 is established and maintained by a business entity, for the purpose of carrying out automated sales of at least one commodity such as a product or service. However, the invention is not limited to automated sales activity. The user 17 could use the browser 38 and the personal computer 16 to communicate directly through the Internet 26 with a Web site of the user server 23, for example as indicated at 58. The user 17 could select a product, and then purchase that product by providing the user server 23 with appropriate information, such as the actual name and address of the user 17, and the number of an actual credit card account belonging to the user 17. The user server 23 would then interact at 57 with the financial institution server 21, in order to obtain payment authorization. The link 57 between the user server 23 and the financial institution server 21 is a common type of link that is routinely used by merchants to obtain authorization to apply charges against a debit card or a credit card, such as a VISA card or a MASTERCARD. The link 57 does not necessarily involve the Internet 26, and could for example involve a telephone link and/or a satellite link.

To facilitate the explanation that follows, it is assumed that the product of interest sold by the user server 23 is an electronic file, which can be delivered electronically through the Internet 26. This electronic file may, for example, be an executable computer program, a file containing a photograph (such as a JPG file), or a file containing music in digital form (such as a WAV or MP3 file). After the user server 23 has obtained payment authorization from the financial institution server 21 through the link 57, the user server 23 can send the purchased electronic file at 56 through the Internet 26 to the personal computer 16 of the user 17, for example in the form of an attachment to an e-mail sent to the actual e-mail address 46.

The actual e-mail address 46 is one form of actual identification for the user 17. Over time, it is possible for others to use the actual e-mail address 46 to accumulate information about the user 17. For example, where the user 17 places several successive orders with the user server 23, the server 23 can recognize that the orders are related, because the information provided by the user 17 for each order includes the same e-mail address 46. The server 23 can then develop a profile regarding the user 17, such as product preferences, buying habits, and so forth. The server 23 may even begin to use this profile information to send unsolicited and unwanted communications directly to the user 17 at 56, using the actual e-mail address 46 of the user 17. These communications could, for example, be targeted advertisements.

A further consideration is that there is a potential for fraudulent activity involving the actual e-mail address 46. As one example, if the operator of the server 23 shares the actual e-mail address 46 with some other not-illustrated entity, for example as part of a sale of a group of e-mail addresses, the other entity could then send the user 17 an e-mail in which the entity misrepresents its identity, in an attempt to fraudulently obtain information or money from the user 17. In this regard, if the entity falsely represents that it is the financial institution 21, and requests that the user 17 provide the password for his or her account, and if the user 17 provided the password, the entity might then be able to make an unauthorized withdrawal of funds from the account without the knowledge of the user 17.

The privacy server 22 uses a known configuration of computer hardware, including a processor 61 and a memory 62. One purpose of the privacy server 22 is to offer the user 17 an increased degree of privacy with respect to other users, such as the user server 23. As a practical matter, the privacy server 22 is also capable of optionally providing the user server 23 with a reciprocal level of privacy in relation to the user 17. However, for simplicity and clarity in explaining the present invention, the following discussion focuses on how the privacy of the user 17 is protected in relation to the user server 23.

In more detail, e-mail communications traveling between the user 17 and the server 23 can all be routed through the privacy server 22. For this purpose, and at the request of the user 17, the privacy server 22 can generate one or more pseudo identities for the user 17, where each pseudo identity includes information such as a pseudo name, a pseudo mailing address, and a pseudo e-mail address. One such pseudo e-mail address is shown diagrammatically at 66.

When the user 17 wants to communicate with the user server 23, the user 17 can send an e-mail at 67 to the privacy server 22. The privacy server 22 can tell that this e-mail originated from the actual e-mail address 46 of the user 17. The privacy server 22 substitutes the pseudo e-mail address 66 for each occurrence in the e-mail of the actual e-mail address 46, and then forwards the modified e-mail at 68 to the user server 23. It will appear to the user server 23 that the e-mail originated from the pseudo e-mail address 66 at the privacy server 22, rather than from the actual e-mail address 46 of the user 17. If the user server 23 then sends an e-mail reply to the pseudo e-mail address 66, the reply e-mail will be routed to the privacy server 22. The privacy server 22 will substitute the actual e-mail address 46 of the user for the pseudo e-mail address 66, and then forward the e-mail at 67 to the actual e-mail address 46 of the user 17.

Each time the user 17 makes a purchase from the user server 23, the user 17 can optionally use a different pseudo e-mail address 66. Consequently, it will appear to the server 23 that these purchases each originated from a different user.

As a result, the server 23 will not be able to recognize that the purchases are actually related. It will therefore be difficult or impossible for the user server 23 to attempt to develop any type of profile information based on these multiple purchases.

In the manner just discussed, use of the pseudo e-mail address 66 can help to reduce or avoid activity such as profiling the buying habits of the user 17, and/or sending targeted advertisements to the user 17. However, if the user 17 provides the user server 23 with the same actual credit card number in order to make each of a series of purchases, the user server 23 can recognize that these multiple transactions are related, because they all share the same actual credit card number. Thus, the user server 23 can still carry out activity such as creating profiles and/or sending targeted advertisements. In order to provide the user 17 with an enhanced degree of privacy, the financial institution server 21 has the capability to provide the user 17 with pseudo credit card numbers that can be given to the user server 23 in lieu of the user's actual credit card number. If a different pseudo credit card number is used for each of several transactions with a given seller, the seller will have difficulty recognizing that those transactions are related.

Turning in more detail to the financial institution server 21, this server has a standard and commercially-available hardware configuration, which includes a processor 76 and a memory 77. Memory 77 stores a variety of programs that can be executed by the processor 76, one of which is a risk analysis program 81 that is a type of program known in the art. For example, when a person is buying a suit at a department store and presents a credit card to a checkout cashier, a request for payment authorization is sent electronically to the financial institution server 21. The risk analysis program 81 then makes a rapid evaluation of whether to approve the transaction, and sends an electronic communication back to the store in order to approve or deny payment. This all occurs in real time, while the purchaser and cashier wait at the checkout counter. The risk analysis program 81 evaluates factors such as the dollar amount of the purchase, the type of commodity being purchased, past activity of the current buyer, the reputation of the seller, and so forth.

The memory 77 stores some data used by the processor 76. This data includes the actual identity 86 of the user 17, where the actual identity includes information such as the actual name of user 17, the actual mailing address of user 17, the actual e-mail address 46 of user 17, the actual home telephone number of user 17, an actual office telephone number of user 17, and/or other identity information. The data in memory 77 also includes information regarding an actual account maintained by the financial institution for the user 17. For simplicity in the present discussion, it is assumed that the actual account is a credit card account of a known type. However, the invention is not limited to a credit card account, and encompasses a variety of other types of accounts. The actual account information maintained at 87 would include, for example, the actual credit card number, the actual expiration date, an actual security code from the back of the credit card, any personal identification number (PIN) established for the card, and so forth.

The information in the memory 77 includes one or more pseudo identities for the user 17, for example as indicated at 91-93. As noted earlier, each of these pseudo identities can include information such as a pseudo name, a pseudo mailing address, a pseudo e-mail address 66, and so forth. The data in the memory 77 also includes information regarding one or more pseudo accounts that have been established by the financial institution for the user 17. Three of these pseudo accounts are indicated at 96-98. For each of these pseudo accounts, several different types of information are maintained.

More specifically, and focusing on the account 96, the stored information includes pseudo account information 101, such as a pseudo credit card account number, a pseudo expiration date, a pseudo security code, a pseudo PIN (if appropriate), and so forth. The information at 96 also includes a list 102 of pseudo identities, which are one or more of the pseudo identities 91-93 that the user 17 has approved for use with that particular pseudo account. The information 96 further includes transaction information 103, which is information about various transactions that have been executed over time using this particular pseudo credit card account number.

The information at 96 also includes a set of rules 104 that govern the use of the pseudo account. The rules for each pseudo account can be different from the rules for other pseudo accounts. A wide variety of rules are possible, and only a few possible rules will be discussed here for the sake of example. In particular, the rules 104 can include provisions restricting use of the associated pseudo account to one or more specific sellers, to a specified class of sellers such as grocery stores or restaurants, or to sellers outside a specified class, such as sellers other than sellers of alcohol or tobacco. The rules 104 can include limits on the number and/or value of transactions. For example, the rules may limit a given pseudo account to use in a single transaction, or to use in a specified number of transactions. The rules may specify a maximum limit for any single transaction, for all transactions, or for all transactions appearing within a specified time period.

Referring again to the memory 36 of the personal computer 16, the information 43 is a copy of the pseudo identity information shown at 91-93, and the information 42 is a copy of the pseudo account information shown at 96-98. The default rule set 41 is configured in advance by the user 17, and then is stored for future use. When a new pseudo account is being established, the user 17 can elect to use the default rule set 41 without any change, or can elect to take the default rule set 41 and make adjustments in order to obtain a modified rule set for use at 104. The user can even configure the rules so that they do not actually restrict the account in any way, which is the equivalent of not having any rules.

A hypothetical example will be helpful in explaining certain aspects of the present invention. In this regard, assume that the user 17 uses the browser program 38 to access the Internet at 58 and to peruse Web pages maintained by the user server 23, where these Web pages provide information about various commodities offered for sale by the server 23. As mentioned earlier, it is assumed in the present discussion that these commodities are products in the form of electronic files that can be delivered through the Internet, such as photographs, digital music files, and/or executable computer programs. At some point, the user 17 selects a particular commodity, and indicates to the server 23 that the user 17 wishes to purchase that commodity. The server 23 then sends the browser 38 a Web page of a known type, which is presented on the display 31 and asks for payment information. The requested payment information would typically include the name of the user 17, the mailing address of the user 17, telephone numbers of the user 17, the e-mail address of the user 17, a credit card account number of the user 17, an expiration date for the credit card, and a security code for the credit card.

Figure 2:
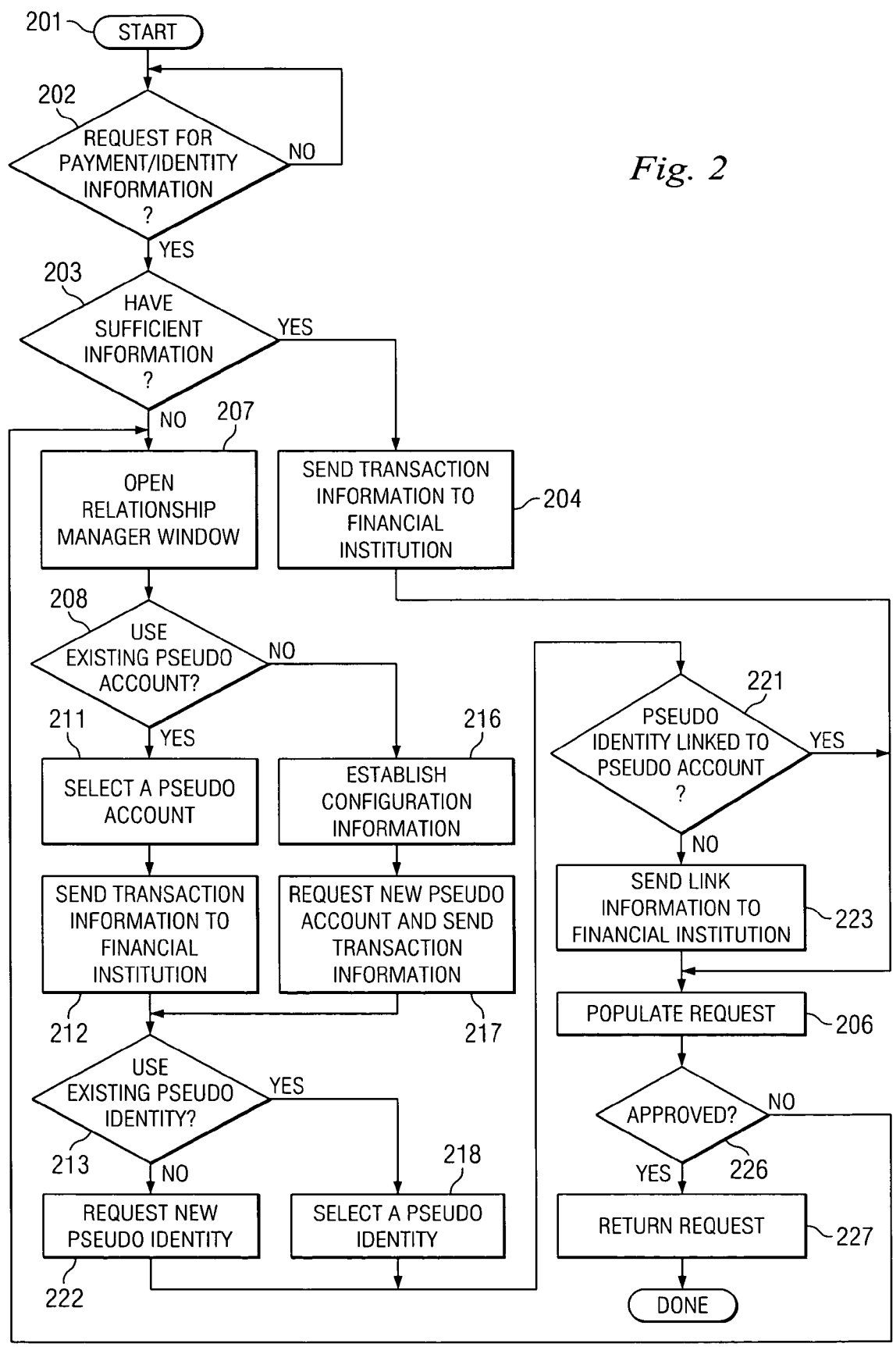
FIG. 2 is a flowchart showing a sequence of operations that can be carried out by a relationship manager which is part of the electronic system of FIG. 1.

FIG. 2 is a flowchart showing a sequence of operations that can be carried out by the relationship manager program 39. This sequence starts at block 201. At block 202, the relationship manager program 39 monitors Web pages retrieved by the browser 38, and waits for a Web page that requests payment information and/or identity information. In the hypothetical example discussed above, the server 23 sends the browser 38 a Web page that requests payment information, including identity information and credit card information.

The browser 38 presents this Web page on the display 31. When the relationship manager 39 detects that the browser 38 has received this Web page, execution of the relationship manager 39 proceeds from block 202 to block 203.

As discussed above, the memory 36 of the personal computer 16 includes a copy 43 of the pseudo identity information for the user 17, and includes a copy 42 of the pseudo account information for the user 17. At block 203, the relationship manager 39 evaluates whether it has sufficient information at 42 and 43 to complete all of the blanks in the request received from the server 23. If so, then control proceeds from block 203 to block 204 where the relationship manager 39 sends certain information regarding the developing transaction to the financial institution server 21. This information includes the commodity being purchased, the price of the commodity, the name of the business that operates the user server 23, and so forth. Control then proceeds from block 204 to block 206, which is discussed later.

If it is determined at block 203 that the relationship manager does not have sufficient information to complete the blanks in the payment request form, control proceeds from block 203 to block 207, where the relationship manager 39 automatically opens an additional window on the display 31, so that the relationship manager 39 can interact directly with the user 17. Control then proceeds from block 207 to block 208, where the relationship manager 39 asks whether the user 17 wishes to use one of the existing pseudo accounts shown at 96-98, or to create a new pseudo account for use in this transaction. If the user elects to use an existing account, then control proceeds from block 208 to block 211, where the user is presented with a list of all of the user's existing pseudo accounts 96-98, so that the user can select one of these accounts. The relationship manager 39 gives the user the capability to search and/or sort the list of pseudo accounts, based on criteria such as a pseudo account number, or the name of a specified entity, such as the name of particular seller. The relationship manager 39 also permits the user 17 to search and/or sort the pseudo account information based on the transaction information 103, for example based on a transaction amount, a pseudo account name, a pseudo account number, a date range, and/or the name of an entity such as a particular seller.

When the user 17 selects one of the existing pseudo accounts, the relationship manager checks to see whether that particular account has expired, for example due to a rule specifying that the account would only be valid until a particular date that has already passed. If the account is expired, then the relationship manager can ask the user whether the user wants to renew that pseudo account, or else select a different existing account. After the user has selected an existing pseudo account that is not expired, the relationship manager 39 proceeds from block 211 in FIG. 2 to block 212. In block 212, the relationship manager 39 sends certain information regarding the developing transaction to the financial institution server 21. This information includes the commodity being purchased, the price of the commodity, the name of the business that operates the user server 23, and so forth. Control then proceeds from block 212 to 213.

Referring back to block 208, if the user indicated that he or she did not want to use an existing pseudo account, but instead wanted to create a new pseudo account, control would proceed from block 208 to block 216. At block 216, the relationship manager 39 interacts with the user 17 in order to establish certain configuration information for the new pseudo account. For example, the relationship manager 39 will give the user 17 the option of either setting up the new pseudo account using a copy of the default rule set 41, without change, or taking the default rule set 41 and modifying some rules in order to customize the rule set for the new pseudo account.

After obtaining all necessary configuration information, the relationship manager proceeds from block 216 to block 217, where it transmits to the financial institution server 21 a request for creation of the new pseudo account. As part of this transmission, the relationship manager 39 also sends the server 21 certain information regarding the developing transaction, such as an identification of the commodity being purchased, the price of the commodity, the name of the business entity operating the user server 23, and so forth. The user 17 and the relationship manager 39 could simultaneously request the creation of multiple new pseudo accounts. However, for simplicity and clarity in explaining the present invention, this discussion assumes that only one new pseudo account is requested.

The financial institution server then creates the new pseudo account, and adds it to the list that already includes the pseudo accounts 96-98. The financial institution server 21 can optionally take the rule set 104 provided for the new account, and add some additional rules that supplement the rules specified by the user 17. For example, the server 21 could specify that payment can only be made to the particular seller involved in the current transaction, that the pseudo account can be used to effect only one payment, that the pseudo account will expire no later than the end of a specified time interval, that the payment for the current transaction must be made within a specified time interval, and so forth. After the new pseudo account has been created, the financial institution server 21 returns the information regarding the new account to the relationship manager 39. The relationship manager 39 adds this information to the pseudo account information that is already stored at 42. Control then proceeds from block 217 to block 213.

At block 213, the relationship manager 39 asks whether the user 17 wishes to use one of the existing pseudo identities 91-93, or to create a new pseudo identity for use in this transaction. If the user elects to use an existing pseudo identity, then control proceeds from block 213 to block 218, where the relationship manager 39 uses the display 31 to present the user 17 with a list of the existing pseudo identities 91-93. The user 17 then selects one of these identities, and control proceeds from block 218 to block 221.

Referring back to block 213, if the user indicates that he or she does not wish to use an existing pseudo identity, then control proceeds from block 213 to block 222, where the relationship manager 39 sends to the privacy server 22 a request for creation of a new pseudo identity. The privacy server 22 would create the new pseudo identity, save it in the memory 62 with other pseudo identities of the user 17, and return the new pseudo identity to the relationship manager 39. The relationship manager 39 would add this new pseudo identity to the existing pseudo identity information already stored at 43, and would also send it to the financial institution server 21, so that it can be added to the list which includes pseudo identities 91-93. Control would then proceed from block 222 to block 221.

At block 221, the relationship manager evaluates whether the selected pseudo identity is already linked to the selected pseudo account, or in other words whether the selected pseudo identity is listed at 102 in association with the selected pseudo account. If the link already exists, then block 223 is skipped. But if either the pseudo account or the pseudo identity is new, then there will not yet be any such link. If the link does not exist, then control proceeds from block 221 to block 223, where the relationship manager 39 cooperates with the financial institution server 21 to so as to link the selected pseudo identity to the selected pseudo account, in particular by adding the selected pseudo identity to the information already stored at 102 for the selected pseudo account. From block 223, control proceeds to block 206.

As discussed earlier, the browser 38 has received from the user server 23 a Web page containing a payment request, with blanks for information such as the name of the user 17, the mailing address of the user 17, the e-mail address of the user 17, a credit card number of the user 17, and so forth. At block 206, the relationship manager 39 populates the blanks in this request form with appropriate information. To the extent that the user has selected a particular pseudo account and a particular pseudo identity, the relationship manager uses this information to populate the blanks in the form. On the other hand, if control proceeded from block 203 through block 204 to block 206, the relationship manager 39 takes an intelligent approach to populating the form. For example, if the rules 104 for the various pseudo accounts show that one of the pseudo accounts has been authorized for use with the specific business entity that operates the user server 23, then the relationship manager 39 would select that pseudo account for use in populating the blanks in the form. Further, once the relationship manager has made an intelligent selection of a pseudo account to use in populating the blanks in the form, the relationship manager takes the list 102 of pseudo identities for that account, and selects one of these pseudo identities for use in populating the blanks of the form. When the blanks in the form have been populated, control proceeds from block 206 to block 226.

As just described, the disclosed embodiment has a relationship manager that can automatically populate the blanks in the payment request form, by making an intelligent selection of a pseudo account and a pseudo identity. Alternatively, however, where the relationship manager finds that it has more information than it needs to populate the form, it could proceed from block 203 to block 207 rather than to block 204. The user 17 could then make the necessary selections, rather than having the relationship manager make intelligent selections. As another alternative, if the relationship manager found that none of the existing pseudo accounts had any indicated association with the business entity operating server 23 in the developing transaction, then instead of making an intelligent selection of some other pseudo account, the relationship manager could proceed from block 203 to block 207 in order to open the relationship manager window and ask whether the user wished to select an existing pseudo account or create a new pseudo account.

At block 226, the user 17 can look at the populated blanks of the form on the display 31, in order to review the information added to the blanks, and determine whether to approve this information. In this regard, the form itself will typically have a "send" button or option, which can be actuated by the user in order to send the completed request form back through the Internet 26 to the user server 23. This would reflect the user's approval of the information in the form. This is indicated diagrammatically in FIG. 2 by block 227.

On the other hand, if the user wanted to alter the information in the form, the user could manually edit the information in the blanks, and then actuate the send button in order to proceed to block 227. Alternatively, the user could express to the relationship manager 39 a desire to interact with the relationship manager for the purpose of changing some or all of the information in the blanks of the form, to thereby cause control to proceed from block 226 back to block 207. In this regard, if control had previously proceeded from block 203 through block 204 to block 206, then the relationship manager window would not necessarily be open on the display 31. The user could express the desire to change information in the form by opening the window for the relationship manager, for example by selecting a button or icon located near an edge of the display 31. But if the relationship manager window had already been opened either manually or at block 207, then this window would include a button or icon that the user 17 could actuate in order to express the desire to change information presented in the blanks of the form.

With reference to block 227, and as discussed above, the relationship manager 39 in the disclosed embodiment can automatically populate the blanks in the payment request form. However, it would alternatively be possible for the relationship manager to facilitate completion of the request form by the user 17, for example by presenting the user 17 with pseudo identity and pseudo account information that could be electronically copied and pasted into the request form.

As discussed above, block 227 is where the Web page containing the pseudo account info and pseudo identity information is returned to the user server 23 through the Internet 26. When the user server 23 receives back the Web page containing this information, the server 23 will typically not be aware that it has received pseudo account information and pseudo identity information, instead of actual account information and actual identity information. The server 23 will therefore process all of this pseudo information in the same manner that it would normally process actual information. In particular, in order to complete the transaction, the user server 23 will prepare a request for payment authorization, and transmit this request at 57 to the financial institution server 21. At a minimum, this request will include the pseudo credit card number, and typically the pseudo expiration date. This request will also include other standard information, such as the total amount of the transaction for which payment is being requested, and the name of the entity to which payment should be made, such as the name of the business entity that operates the user server 23.

Traditionally, when a financial institution receives this type of payment request, it is the first notice to the financial institution that a transaction is pending, and the first notice of specific information about that transaction, such as the specific product being purchased, the amount of the transaction, and the name of the seller. Since the customer and seller are usually waiting in real time for approval of the transaction, the financial institution has only a very short period of time in which to carry out a risk analysis and decide whether to approve or deny the requested payment, for example just a few seconds.

However, one aspect of the present invention is that, for example as discussed above in association with blocks 204, 212 and 217 in FIG. 2, information regarding the developing transaction is provided to the financial institution server 21 at a point in time before the transmission of payment information from the user 17 to the user server 23, and thus before the user server 23 transmits a request for payment authorization to the financial institution server 21. By providing this transaction information to the financial institution server 21 at an earlier point in time, the financial institution server 21 can initiate execution of the risk analysis program 81 before the server 21 receives the request for payment authorization from the user server 23. As a result, the financial institution server 21 will have more time to carry out risk analysis. For example, this will provide the financial institution server 21 with at least an additional 30 seconds or so, or possibly several minutes. This additional time is highly advantageous, because it permits the financial institution to carry out a risk analysis that is more thorough than would otherwise be possible.

A further consideration is that this transaction information is not only received by the financial institution in advance of the payment request, but is received from an entity other than the user server 23, which can help the financial institution deter fraud. For example, if the information provided by the user server 23 leads the user 17 to understand that he or she is making a purchase from a known and respected seller such as Sears, but the payment request received at 57 by the financial institution server 21 indicates that the payee is to be some other entity, such as Fly-By-Night Enterprises, the financial institution server 21 can detect the discrepancy and take appropriate action. For example, the server 21 could deny payment, or at least instruct the risk analysis program 81 to assign the transaction a higher risk factor.

With respect to the transaction information that is provided in advance to the financial institution server 21, for example at block 204, block 212 or block 217, it should be recognized that any price information therein may be just the price of the commodity itself, and not the ultimate total for the transaction. For example, if the purchased product is a physical item that will need to be shipped, the user 17 may not yet have selected a particular type of delivery, and the transaction may ultimately involve a shipping fee in an amount that is not yet known. Similarly, there may be other costs that will be added later, such as a sales tax and/or a handling fee. Consequently, to the extent that the financial institution server 21 is able to initiate execution of the risk analysis program 81 at an earlier point in time, the risk analysis program 81 may need to allow for the fact that the final cost of the transaction could be somewhat higher than the initial price information received from the relationship manager 39. Therefore, when initiating the risk analysis, the financial institution server 21 may have the program 81 carry out the risk analysis using a higher dollar amount than that in the advance information received from the relationship manager 39. In addition, the server 21 may record this higher amount as a cap for the developing transaction. If the payment request eventually sent by the user server 23 specifies an amount that is higher than the cap, the financial institution server 21 can either deny the requested payment, or revisit the risk analysis before approving the transaction.

When the financial institution server 21 notifies the user server 23 that the request for payment has been either approved or denied, the financial institution server 21 does so using the pseudo account and/or pseudo identity of the user 17, without revealing the actual account 87 or the actual identity 86 of the user 17. The financial institution server 21 has records for the transaction that link the actual account 87 and the actual identity 86 with the pseudo account and the pseudo identity used in the transaction. Consequently, in the unlikely event of a legal investigation by government authorities, each transaction can in fact be ultimately linked to the actual identity 86 and actual account 87 of the user 17.

After the exemplary transaction has been completed and the purchased product has been delivered, the financial institution server 21 will eventually provide the user 17 with a statement covering activity in the user's various accounts. This statement may be sent by mail, or may be provided in electronic form, so that the user 17 can access it with the browser 38 through the Internet 26. If the user 17 challenges a transaction in the statement, then the financial institution server 21 would reverse the payment to the user server 23 in a manner known in the art, using the pseudo identity and the pseudo account information in order to avoid revealing to server 21 the actual identity 86 or actual account 87 of the user 17.

As discussed above, the user 17 can use the relationship manager 39 to access pseudo account information, such as that stored at 42. The user 17 can use the relationship manager to select one of the pseudo accounts and either give it expired status, or delete it from the group of pseudo accounts. The relationship manager 39 would then record this information at 42, and also interact with the financial institution server 21 so that the server 21 can update the information at 91-93 for that selected pseudo account.

Although it has been assumed for the sake of example that user 17 carries out the transaction in question using both a pseudo identity and a pseudo account, it would alternatively be possible for the user 17 to use a pseudo account in association with the actual identity 86, or to use the actual account 87 in association with a pseudo identity. But using both a pseudo identity and a pseudo account promotes increased privacy for the user 17. A further consideration is that there may be situations where the user server 23 sends the user 17 a Web page that requests only payment information but not identity information, or that requests only identity information but not payment information. As one example, the user server 23 may be prepared to send an electronic file to the user 17 without charge, if the user 17 provides identity information in order to register with the server 23. It will be recognized that the disclosed embodiment, including the relationship manager 39, can readily handle these types of variations.

One embodiment of the invention has been illustrated and described in detail. However, this embodiment is merely one example of the invention, and the invention is not limited to this particular embodiment. A variety of modifications and variations can be made without departing from the spirit and scope of the present invention, as defined by the following claims.

What is claimed is:

1. A computer-readable memory medium storing program instructions, wherein the program instructions are executable by a client computer system to:

automatically examine a web page, wherein the web page has been received by the client computer system from a web site over the Internet, wherein said examining is performed to determine whether the web page includes a plurality of blank fields to be populated in order to facilitate a payment for a purchase from the web site on behalf of a user of the client computer system, wherein the blank fields include: (a) one or more first fields to be filled with payment information relating to the user, and (b) one or more second fields to be filled with identity information relating to the user; and in response to said examination determining that the web page includes said plurality of fields:
      populate said one or more first fields with first information regarding a first pseudo account of the user;
      populate said one or more second fields with second information regarding a first pseudo identity of the user; and wherein the first information and second information are sent to the web site in order to facilitate the payment;

wherein the first pseudo account has been created for the user by a first server associated with a financial institution, wherein the financial institution maintains a first actual account for the user and stores a link between the first pseudo account and the first actual account, the first actual account having an associated first account number;

wherein the second information is usable by a first entity associated with the web site to receive said authorization for payment from the first server, wherein the second information does not include the first account number;

wherein the first pseudo identity has been created for the user by a second server associated with a second entity distinct from the first entity and the financial institution, wherein the first pseudo identity does not contain any information regarding an actual identity of the user.

2. The memory medium of claim 1, wherein the program instructions are executable to:

display a list of previously created pseudo accounts; and
   receive input from the user selecting one of the listed pseudo accounts as said first pseudo account to be used in populating the web page.

3. The memory medium of claim 1, wherein the program instructions are executable to:
   search and/or sort a first list of previously created pseudo accounts;
   display a second list resulting from said searching and/or sorting on a display device; and
   enable the user to select the first pseudo account from the displayed second list.

4. The memory medium of claim 1, wherein the program instructions are executable to:
   display a list of previously created pseudo identities; and
   receive input from the user selecting one of the listed pseudo identities as said first pseudo identity to be used in populating the web page.

5. The memory medium of claim 1, wherein the program instructions are executable to:
   search and/or sort a first list of previously created pseudo identities;
   display a second list resulting from said searching and/or sorting on a display device; and
   enable the user to select the first pseudo identity from the displayed second list.

6. The memory medium of claim 1, wherein the program instructions are executable to:
   send a request to the first server for creation of the first pseudo account; and
   receive the first pseudo account from the first server.

7. The memory medium of claim 1, wherein the program instructions are executable to:
   send a request to the second server for creation of the first pseudo identity; and
   receive the first pseudo identity from the second server.

8. The memory medium of claim 1, wherein the purchase is of a first data file, wherein the program instructions are executable to receive the first data file from the web site.

9. The memory medium of claim 8, wherein the program instructions are executable to access an email from the second server, wherein the email includes the first data file, wherein the email is addressed to a first pseudo email address included as part of the second information.

10. The memory medium of claim 1, wherein the first pseudo account is a pseudo credit card account.

11. The memory medium of claim 1, wherein the program instructions are executable to facilitate repeated purchases for the user from the web site using respective pseudo identities, wherein each of the pseudo identities includes a different pseudo email address.

12. The memory medium of claim 1, wherein the program instructions are executable to automatically select the first pseudo account from a list of previously created pseudo accounts based on a user-specified rule that specifies use of the first pseudo account for transactions with said web site.

13. The memory medium of claim 1, wherein the program instructions are executable to:
   verify that the first pseudo account satisfies one or more user-defined rules regarding use of the first pseudo account.

14. The memory medium of claim 1, wherein the program instructions are executable to associate one or more rules with the first pseudo account in response to user input specifying the one or more rules, wherein the one or more rules include one or more of the following:
   a first rule limiting use of the first pseudo account to one or more specified web sites;
   a second rule limiting use of the first pseudo account to a specified class of web sites;
   a third rule limiting use of the first pseudo account to sellers outside of a specified class.

15. The memory medium of claim 1, wherein the program instructions are executable to associate one or more rules with the first pseudo account in response to user input specifying the one or more rules, wherein the one or more rules include one or more of the following:
   a first rule limiting use of the first pseudo account to a maximum amount for any single transaction;
   a second rule limiting use of the first pseudo account to a maximum amount for specified time period;
   a third rule limiting use of the first pseudo account to a cumulative maximum amount for all transactions using the first pseudo account.

16. The memory medium of claim 1, wherein the program instructions are executable to associate one or more rules with the first pseudo account in response to user input specifying the one or more rules, wherein the one or more rules include one or more of the following:
   a first rule limiting use of the first pseudo account to a single transaction;
   a second rule limiting use of the first pseudo account to a specified number of transactions.

17. A system comprising:
   a first server configured to maintain a first pseudo account and a first actual account for a first user and to store a link between the first pseudo account and the first actual account, wherein the first server is associated with a financial institution, wherein the first pseudo account has first pseudo account information that specifies the first pseudo account;
   a second server configured to create and maintain a first pseudo identity for the first user, wherein the first pseudo identity includes a first pseudo email address, wherein the second server is associated with a first entity different from the financial institution;
   wherein the first server is configured to receive a request for authorization of a payment on behalf of the user, wherein the request is from a second entity associated with a website, wherein the request includes at least a portion of the first pseudo account information, wherein the second entity is different from the first entity and the financial institution, wherein the first server is configured to operate without disclosing to the second entity any information regarding the first actual account of the user;
   wherein the second server is configured to:
      receive an email which is addressed to the first pseudo email address, wherein the email includes an attached file from the website, wherein the attached file is a thing being purchased by said purchase; and
      make the email available to the first user via the Internet.

18. The system of claim 17,
   wherein the first server is configured to grant or deny said authorization for said payment based on a result of a risk analysis on the second entity.

19. The system of claim 17, wherein the first server and second server are controlled by or operated for a financial institution.

* * * * *